US011321790B2

(12) United States Patent
Valdhorn et al.

(10) Patent No.: US 11,321,790 B2
(45) Date of Patent: May 3, 2022

(54) SYSTEM AND METHOD FOR VEHICLE IDENTIFICATION BASED ON FUELING CAPTURES

(71) Applicant: Tanku LTD., Haifa (IL)

(72) Inventors: Dan Valdhorn, Haifa (IL); Nadav Maoz, Rehovot (IL); Alon Amster, Haifa (IL)

(73) Assignee: Tanku LTD., Haifa (IL)

( * ) Notice: Subject to any disclaimer, the term of this patent is extended or adjusted under 35 U.S.C. 154(b) by 0 days.

(21) Appl. No.: 16/392,747

(22) Filed: Apr. 24, 2019

(65) Prior Publication Data

US 2019/0332870 A1 Oct. 31, 2019

Related U.S. Application Data

(60) Provisional application No. 62/698,555, filed on Jul. 16, 2018, provisional application No. 62/662,520, (Continued)

(51) Int. Cl.
*G06Q 50/06* (2012.01)
*G06K 9/00* (2006.01)
(Continued)

(52) U.S. Cl.
CPC ............... *G06Q 50/06* (2013.01); *B60S 5/02* (2013.01); *B67D 7/0401* (2013.01); *B67D 7/145* (2013.01); *G06K 9/00624* (2013.01); *G06K 9/00771* (2013.01); *G06K 9/6201* (2013.01); *G06Q 30/0185* (2013.01); *G06T 7/73* (2017.01);
(Continued)

(58) Field of Classification Search
CPC ...... G06Q 50/06; G06Q 30/0185; B60S 5/02; G07C 5/008; B67D 2007/0442; B67D 2007/0463; B67D 2007/0473; B67D 7/0401; B67D 7/145; G06K 2209/15; G06K 2209/23; G06K 9/6267; G06K 9/00771; G06K 9/6201; G06K 9/00624; G06T 2207/30232; G06T 2207/30252;
(Continued)

(56) References Cited

U.S. PATENT DOCUMENTS 6,085,805 A 7/2000 Bates
6,157,871 A 12/2000 Terranova
(Continued)

FOREIGN PATENT DOCUMENTS

WO 2006005953 1/2006
WO 2013006911 1/2013
(Continued)

OTHER PUBLICATIONS

Intl Search Report of PCT/IB2019/053377.
(Continued)

*Primary Examiner* — Jianxun Yang

(57) ABSTRACT

The subject matter discloses a method, the method comprises receiving an event of capturing a capture of a vehicle; generating a signature of the vehicle from the capture; comparing the signature to a second signature; wherein the second signature is associated with an identified vehicle, the comparing resulting in a level of confidence; and if the level of confidence exceeds a threshold then identifying the vehicle as the identified vehicle.

19 Claims, 8 Drawing Sheets

Related U.S. Application Data filed on Apr. 25, 2018, provisional application No. 62/662,561, filed on Apr. 25, 2018, provisional application No. 62/662,569, filed on Apr. 25, 2018, provisional application No. 62/662,539, filed on Apr. 25, 2018.

(51) Int. Cl.

| | | |
|---|---|---|
| *G06Q 30/00* | (2012.01) | |
| *G06T 7/73* | (2017.01) | |
| *G06K 9/62* | (2006.01) | |
| *H04N 7/18* | (2006.01) | |
| *B60S 5/02* | (2006.01) | |
| *B67D 7/04* | (2010.01) | |
| *B67D 7/14* | (2010.01) | |
| *G07C 5/00* | (2006.01) | |

(52) U.S. Cl.
CPC .............. *G07C 5/008* (2013.01); *H04N 7/18* (2013.01); *B67D 2007/0442* (2013.01); *B67D 2007/0463* (2013.01); *B67D 2007/0473* (2013.01); *G06K 2209/15* (2013.01); *G06K 2209/23* (2013.01); *G06T 2207/30232* (2013.01); *G06T 2207/30252* (2013.01)

(58) Field of Classification Search
CPC . G06T 7/73; H04N 7/188; H04N 7/18; G07B 15/00
See application file for complete search history.

(56) References Cited

U.S. PATENT DOCUMENTS

| | | | |
|---|---|---|---|
| 8,292,168 | B2 | 10/2012 | Vilnai et al. |
| 9,881,432 | B2 | 1/2018 | McQuade et al. |
| 10,319,166 | B2 | 6/2019 | Gaddam et al. |
| 10,551,502 | B2 | 2/2020 | Buehs et al. |
| 2003/0041330 | A1 | 2/2003 | Smith |
| 2006/0012479 | A1 | 1/2006 | Ezra |
| 2009/0289113 | A1 | 11/2009 | Vilnai et al. |
| 2010/0191674 | A1 | 7/2010 | Condon |
| 2011/0208568 | A1 | 8/2011 | Deitiker et al. |
| 2012/0162422 | A1 | 6/2012 | Lester |
| 2013/0216102 | A1 | 8/2013 | Ryan et al. |
| 2014/0263629 | A1 | 9/2014 | McQuade et al. |
| 2014/0267741 | A1 | 9/2014 | King |
| 2015/0120474 | A1 | 4/2015 | Webb et al. |
| 2015/0242855 | A1* | 8/2015 | Vilnai ................... G07F 13/025 705/44 |
| 2016/0035013 | A1 | 2/2016 | Plattenburg et al. |
| 2017/0069152 | A1 | 3/2017 | McQuade et al. |
| 2017/0103270 | A1* | 4/2017 | Reiff ......................... G06T 7/90 |
| 2017/0243410 | A1 | 8/2017 | Caballero |
| 2017/0308964 | A1 | 10/2017 | Morris et al. |
| 2018/0009651 | A1 | 1/2018 | Payne |
| 2018/0052467 | A1 | 2/2018 | Dudar |
| 2018/0106654 | A1 | 4/2018 | Kim et al. |
| 2018/0107891 | A1 | 4/2018 | Schmidt et al. |
| 2018/0137367 | A1* | 5/2018 | Pavetic ............. G06K 9/00758 |

FOREIGN PATENT DOCUMENTS

| | | |
|---|---|---|
| WO | 2013079974 | 6/2013 |
| WO | 2018052416 | 3/2018 |
| WO | 2018069940 | 4/2018 |

OTHER PUBLICATIONS

"Spanish petrol company curbs drive-offs with high-tech surveillance"; Axis communications, 2013; asmag.com (Year: 2013).

* cited by examiner

SYSTEM AND METHOD FOR VEHICLE IDENTIFICATION BASED ON FUELING CAPTURES

CROSS-REFERENCE TO RELATED APPLICATIONS

This application claims priority to U.S. Provisional Patent Application No. 62/662,520, filed Apr. 25, 2018, and entitled "System for Validating an Access to a Service"; U.S. Provisional Patent Application No. 62/662,539, filed Apr. 25, 2018, and entitled "System and Method for Automatic Customer Identification"; U.S. Provisional Patent Application No. 62/662,561, filed Apr. 25, 2018, and entitled "Mobile Devices Association with Objects and Persons"; U.S. Provisional Patent Application 62/662,569 filed Apr. 25, 2018, and entitled "Fulltime Learning for Detection or Identification Systems"; and U.S. Provisional Patent Application No. 62/698,555, filed Jul. 16, 2018, and entitled "System and Method for Analyzing Images of Vehicles", the disclosures of which are hereby expressly incorporated by reference in their entireties.

FIELD OF THE INVENTION

The present disclosure relates to image processing in general, and to detecting a vehicle in a capture, in particular.

BACKGROUND OF THE INVENTION

Fueling operation in a gas station or a charging station is typically performed by a credit or a debit card. The user enters its debit or credit card or payment card to a specific payment terminal in order to perform the transaction. In some cases a vehicle identification device (typically equipped with an RFID reader) is used for charging or fueling. In other cases a mobile payment method is used. Such a mobile payment typically generates a pin code in response to a request for performing a charging or fueling. In some cases the user has to enter various data such as the pin code and the selected fueling device to the payment terminal or telephone.

SUMMARY OF THE INVENTION

The term computing device refers herein to a device that includes a processing unit. Examples for such devices are a personal computer, a laptop, a server, a tablet a cellular device, a mobile device of a driver, a computing device embedded in a vehicle and IOT (internet of things) device.

The term site refers herein to a charging station or a refueling station. The refueling may refer, for example, to petrol, gas, hydrogen, biologic refueling etc. The charging operation includes electronic charging which may be implemented, for example, by replacing a battery or by connecting to a charger.

The term property or property of the vehicle refers herein to properties that enable to identify the vehicle by methods such as image processing and deep learning. Such properties may be generic properties or unique properties. Such generic properties may by properties that are generic to the vehicle model and make. Such generic properties include for example color, make, plate number, size of the vehicle, vehicle type and vehicle model. Such generic properties may also include the entities that are authorized to power the vehicle (e.g. the driver, family member an employee in a company that holds a fleet of vehicles etc).

The unique properties may include properties that are specific to a certain vehicle and that may be changed in time. Such unique properties may be explicit (humanly distinguishable) or implicit (embedded in neural networks or detected by neural networks). Examples of explicit properties are specific damages to the vehicle, color of the vehicle, a sticker and the like. The explicit properties may be identified by object detection techniques, for example convolutional or neural network. An example for such a neural network is the YOLO real time object detection tool.

The term signature refers herein to one or more values that are calculated from the generic properties or from the unique properties or a combination thereof, wherein each property may be assigned with a certain weight.

The signature may be used to associate two vehicles in the same time frame, in one example such an association may allow to identify the vehicle.

A signature from one or more captures of the same vehicle may be used as a reference in the re-identification process.

The weight of a property in re-identification and in particular, the unique properties may be affected by the time of the capture; thus a recent event has more influence on the signature value comparing to an old event. Examples of such events are accident or a tire change.

In another example a weight of a property in a reference signature update process may be increased if it is sufficiently different than the same property in the reference signature. An example of such scenario is an accident considerably changing the appearance of the right side of the vehicle.

According to some embodiments a property is also assigned a weight when computing similarity between signatures. In such an embodiment a property that enables to better differ an item from other items may be assigned with a higher weight. For example a property that identifies a unique sticker on a vehicle may be assigned with a high weight and may affect the signature similarity more than other properties.

Each object may have a signature and the signature of a vehicle may be comprised from other object signatures. In one example value the signature of a plate number may be derived from the number of digits in the plate number and the position of each digit within the plate number. The signature of the vehicle may be derived from the signature of the plate number and/or other signatures of other properties or any combination thereof. Such other signature may be for example the signature of the headlights of the vehicle.

The term confidence level refers herein to a value that represents a level of certainty in indentifying a vehicle. Such a value may be derived from comparing the properties of the item or the signature of an item to properties or a signature of another item. If the value is above threshold the confidence level may lead to identifying a vehicle. In one example a confidence level of identifying a vehicle by comparing a signature that is calculated from a capture of a vehicle to an existing signature may be 90%.

The confidence level may also be affected by elimination methods. For example, the confidence level of an identification of a vehicle whose plate number is hidden may increase due to the fact that this vehicle is the only vehicle on site at the time frame of calculating the confidence level.

Another example would be reduced (or nullified) confidence of vehicle identification, if the same vehicle was identified a short time ago at a location distant from the current location.

The term powering refers herein to fueling or charging. The fueling maybe, for example, by gas or petrol or hydrogen biologic materials or any other materials that could provide power to the vehicle.

The term powering device refers herein to a fuel pump or to an EV charging spot.

The term transaction or powering transaction refers herein to a transaction of powering a vehicle. Such a transaction can be requested by any entity that is authorized to perform the payment (authorized entity) and regardless of the location of the entity. The transaction does not necessarily entail the transferring of money. An example of a transaction with no money transfer is when a vehicle belongs to a fleet and the transaction is performed in an internal site.

The term authorized-entity refers herein to the entity that is authorized to perform the transaction. The entity may be a person or a computing device such as a computing device of an autonomic vehicle. In one example the authorized entity is authorized to power a plurality of vehicles. In other examples the authorized entity shares the authorization to power the vehicle with other authorized entities (for example when powering a family vehicle or a vehicle that belongs to a fleet of vehicles).

The term capturing device refers herein to any device that is configured to capture images, a sequence of images, videos, and so forth. The capturing device includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of capturing device technologies may include: CCD, CMOS, NMOS, and so forth. 3D sensors may be implemented using different technologies, including: stereo camera, active stereo camera, time of flight camera, structured light camera, radar, range image camera, and so forth. The capturing devices may be located near the powering device and may capture the powering area or may be located in various other locations on site and may capture the whole site or portions from the site.

The term capture refers herein to a still image or video.

The term requestor refers herein to a computing device or to a person.

The term powering area refers herein to an area surrounding a certain powering device in which a vehicle is able to park for powering with this certain powering device. Such an area may be configured when installing the system in a site.

The definition of such an area takes into account the distance between the fuel inlet or the socket and the powering device, the position of the powering device, the length of the hose or charging cable, etc.

The definition may be preformed manually or by a learning process.

The learning process may learn the locations in the site in which vehicles park, the location of the powering devices, the distance between the fuel inlet or the socket and the powering device, the position of the powering device and the length of the hose or charging cable.

The powering area may be defined by X and Y coordinates.

Embodiments of the invention disclose system and methods for performing for and authenticating fueling or charging transaction.

According to some embodiments the system enables a driver or several drivers who register to the system to be able to perform a transaction of powering a vehicle via a computing device. The system enables a manager of a fleet of vehicles to authorize drivers to power one or more vehicles from the fleet of vehicle via a computing device.

According to some embodiments, upon installation, the system couples the capturing devices of a site to one or more computing devices for processing the captures of the vehicles. The coupling is for authenticating and supervising the transaction and for preventing frauds.

According to some embodiments the system identifies the vehicles that enter the site. According to some embodiments the system authenticates the requestor to fuel or charge the vehicle. According to some embodiments the system initiates authenticates and monitors the fueling process, detects potential fraud events and takes preventive actions. The authentication of the transaction includes the authentication of the vehicle and the authentication of the location of the vehicle and may also include the authentication of the location of the requestor. According to some embodiments the system documents the transaction and reports the events associated with the transaction including visual images from the capturing device.

According to some embodiments the system utilizes properties of the vehicle which are configured at installation and properties that are learned from on-line training, as well as the identification of the requestor of the transaction for authenticating the powering transaction.

Embodiments of the invention may be implemented as a computer process (method), a computing system, or as an article of manufacture, such as a computer program product or a non-transitory computer-readable media. The computer program product may be a computer storage media readable by a computer system and encoding a computer program of instructions for executing a computer process on the computer and network devices. The computer program product may also be a propagated signal on a carrier readable by a computing system and encoding a computer program of instructions for executing a computer process.

One technical problem disclosed by the present invention is how to identify the vehicle plate. The identification by a CCTV camera only yields poor results. Additionally environment condition may affect the result of the definition by a capture.

One other technical problem is how to eliminate the need for installing special equipment on site and in the vehicles. Such a problem may occur for example when using RFID readers for identifying the car.

One other technical problem is how to prevent frauds. Methods known in the art are vulnerable to frauds such as transferring a fueling device to an unauthorized vehicle, utilizing the transaction for fueling or charging another vehicle or a container by removing the hose from the fueling inlet of the vehicle after the transaction is authorized and inserting the hose to a fueling inlet of another vehicle or to a container or by utilizing a fueling card that is dedicated to fuel an unauthorized vehicle for fueling and unauthorized vehicle, etc.

One other technical problem is how to provide a more efficient powering transaction with fewer steps.

One other technical problem is how to prevent the vehicle from parking in non authorized area.

One other technical problem is how to avoid fueling of a non authorized user.

One exemplary embodiment of the disclosed subject matter is a method, the method comprises receiving a request for fueling of a vehicle in a site; receiving a capture of the vehicle; if location of the vehicle detected from the capture is within a certain powering area of the site then: retrieving from a data repository an identification of a pump associated with the powering area; and instructing a computing device controlling the pump to start the fueling.

According to some embodiments if the location of the vehicle detected from the capture is not within the powering area then alerting or preventing the fueling. According to some embodiments the method further comprising determining the powering area in accordance with one member selected from a group consisting of: type of the vehicle, length of a hose of the powering device, distance between a fuel inlet of the vehicle and the powering device, location of the powering device, position of the powering device, learning process of locations in the site in which vehicles park and learning process of structure of the site.

According to some embodiments the method further comprising selecting a nozzle of the pump, wherein the selecting being in accordance with one member selecting from a group consisting of: make of the vehicle, fuel type of the vehicle and charging method. According to some embodiments the method further comprises instructing the computing device to unlock the selected nozzle and to start the powering process. According to some embodiments the capture of the vehicle is associated with the requestor. According to some embodiments the request originated from a mobile device associated with the vehicle. According to some embodiments the method further comprising authenticating the vehicle. According to some embodiments the method further comprising: receiving an indication of a fueling transaction associated with a certain vehicle and a fueling site; obtaining a capture of a vehicle in the site; accessing a vehicle profile associated with the vehicle; analyzing the capture for identifying at least one discrepancy between the vehicle profile and the vehicle; and updating profile of the vehicle in accordance with the discrepancy. According to some embodiments the method further comprising: receiving an indication of a fueling transaction associated with the vehicle and a site; in response to the received indication, accessing information related to the vehicle; obtaining a capture of the vehicle in the site; generating a data example comprising a depiction of the vehicle based on the capture and the information related to the vehicle; and adding the data example to a dataset. According to some embodiments the method further comprising obtaining image data depicting the fueling transaction; analyzing the image data to detect a first part of the image data depicting a connection of a fueling nozzle to the vehicle; analyzing the image data to detect a second part of the image data depicting a disconnection of the fueling nozzle from the specific vehicle; and generating a visual summary of the fueling transaction comprising at least the detected first part of the image data and the detected second part of the image data, while omitting at least the a third part of the image data located between the detected first part and the detected second part. According to some embodiments the method further comprising transmitting a request for a second requestor for approving the transaction. According to some embodiments the method further comprising approving said transaction by a second entity. According to some embodiments the method further comprising obtaining image data depicting the fueling transaction. According to some embodiments the method further comprising analyzing the image data to detect a first part of the image data depicting a connection of a fueling nozzle to the specific vehicle; analyzing the image data to detect a second part of the image data depicting a disconnection of the fueling nozzle from the specific vehicle; and generating a visual summary of the fueling transaction comprising at least the detected first part of the image data and the detected second part of the image data, while omitting at least the a third part of the image data located between the detected first part and the detected second part. According to some embodiments the method further comprising archiving the generated visual summary in a digital archive in conjunction with information related to the fueling transaction. According to some embodiments the image data comprises a sequence of frames, the detected first part comprises at least part of a first frame, the detected second part comprises at least part of a second frame, and the third part comprises at least an entire frame located after the first frame and before the second frame in the sequence of frames.

According to some embodiments the method further comprising: analyzing the image data to detect a depiction of face of a person associated with the fueling transaction; and archiving the detected depiction of the face of the person associated with the fueling transaction in a digital archive in conjunction with information related to the fueling transaction. According to some embodiments the method further comprising: analyzing the image data to detect a depiction of the specific vehicle; and archiving the detected depiction of the specific vehicle in a digital archive in conjunction with information related to the fueling transaction. According to some embodiments the method further comprising: obtaining an indication of a confidence level associated with the fueling transaction; in response to a first value of the confidence level, generating the visual summary with a first level details; and in response to a second value of the confidence level, generating the visual summary with a second level details, the second level is higher than the first level. According to some embodiments the method further comprising: analyzing the image data to detect a forth part of the image data depicting a vehicle; and including the forth part of the image data to the generated visual summary of the fueling transaction.

One exemplary embodiments of the disclosed subject matter is a method, the method comprises receiving an event indicating a starting of fueling a vehicle while in the fueling: receiving a plurality of captures of the vehicle; processing the plurality of captures for identifying a plurality of locations of the vehicle; each respectively associated with corresponding capture from the plurality of captures; identifying a movement of the vehicle from the plurality of locations; as a result of the identifying performing a mitigation action for mitigation an event associated with the movement.

According to some embodiments the event being a fraud event. According to some embodiments the event being a safety event. According to some embodiments the mitigating comprises alerting or preventing the fueling. According to some embodiments the method further comprising detecting a second event of a nozzle being removed from a fuel inlet of the vehicle and inserted into a second vehicle and identifying a fraud. According to some embodiments the method further comprising detecting a second event of a nozzle being removed from a fuel inlet of the vehicle and inserted into a container and identifying a fraud. According to some embodiments the method further comprising notifying the event. According to some embodiments the method further comprises identifying a second vehicle in a powering area and detecting a fraud. According to some embodiments the method further comprises identifying a location of the vehicle in away from a center of the powering area and detecting a fraud. According to some embodiments the method further comprises identifying a person in the powering area and detecting a fraud. According to some embodiments the method further comprises identifying the vehicle outside of the powering area and detecting a fraud. According to some embodiments the method further comprising Identifying a different vehicle parking next to the fueling vehicle in a suspicious manner and detecting a fraud. According to some embodiments the method further comprising identifying the vehicle in a list of suspicious vehicles and detecting a fraud. According to some embodiments an indication that at the first time fueling associated with the fueling transaction is in progress is based on information from a dispenser associated with fueling transaction. According to some embodiments the method further comprising analyzing at least one capture of the fueling transaction to identify the dispenser associated with fueling transaction. According to some embodiments the method further comprising, in response to the determination of the suspicion of the fraud, providing an indication to a user. According to some embodiments the method further comprising, in response to the determination of the suspicion of the fraud, causing the fueling to stop.

One other exemplary embodiment of the disclosed subject matter is a method, the method comprises: receiving a capture of a vehicle while the vehicle fueling; processing the capture for identifying a location of an inlet of the vehicle; the identifying being in accordance with a model of the vehicle; processing the capture for detecting an event of a nozzle being removed from the inlet of the vehicle; and if the event being detected then performing mitigation action. According to some embodiments the event being a fraud event. According to some embodiments the event being a safety event. According to some embodiments the mitigating comprises alerting or preventing the fueling. According to some embodiments the method further comprising detecting a second event of a nozzle being removed from a fuel inlet of the vehicle and inserted into a second vehicle and identifying a fraud. According to some embodiments the method further comprising detecting a second event of a nozzle being removed from a fuel inlet of the vehicle and inserted into a container and identifying a fraud. According to some embodiments. According to some embodiments the method further comprising notifying the event. According to some embodiments the method further comprises identifying a second vehicle in a powering area and detecting a fraud.

According to some embodiments the method further comprises identifying a location of the vehicle in away from a center of the powering area and detecting a fraud. According to some embodiments the method further comprising. According to some embodiments the method further comprises identifying a person in the powering area and detecting a fraud. According to some embodiments the method further comprising further comprising identifying the vehicle outside of the powering area and detecting a fraud.

According to some embodiments the method further comprising identifying the vehicle in a list of suspicious vehicles and detecting a fraud. According to some embodiments an indication that at the first time fueling associated with the fueling transaction is in progress is based on information from a dispenser associated with fueling transaction. According to some embodiments the method further comprising analyzing at least one capture of the fueling transaction to identify the dispenser associated with fueling transaction. According to some embodiments the method further comprising response to the determination of the suspicion of the fraud, providing an indication to a user. According to some embodiments the method further comprising in response to the determination of the suspicion of the fraud, causing the fueling to stop. According to some embodiments the method further comprising upon detecting exit of the vehicle from the powering area without payment transmitting an alert.

One other exemplary embodiment of the disclosed subject matter is a method, the method comprises: receiving an event of capturing a capture of a vehicle; generating a signature of the vehicle from the capture; comparing the signature to a second signature; wherein the second signature is associated with an identified vehicle, the comparing resulting in a level of confidence; and if the level of confidence exceeds a threshold then identifying the vehicle as the identified vehicle.

According to some embodiments the generating the signature being in accordance with a unique property extracted from the capture or in accordance with a generic property extracted from the capture or a combination thereof. According to some embodiments the method wherein if the level of confidence exceeds the threshold then performing re-identification for generating an improved confidence level. According to some embodiments the method wherein the re-identification comprising comparing the unique property with other unique property extracted from a previous capture associated with the vehicle. According to some embodiments the method further comprising if the improved confidence level is below a certain threshold then identifying a fraud.

According to some embodiments the fraud is associated with changing a plate of the vehicle or replacing a plate of the vehicle. According to some embodiments the method, further comprises performing association between pluralities of captures of the vehicle from a plurality of locations in the site for improving the signature of the vehicle. According to some embodiments the method further comprises receiving a request for fueling and wherein the identified vehicle is associated with the requestor. According to some embodiments wherein the request originated from a mobile device associated with the vehicle. According to some embodiments the signature comprises at least one property wherein the at least one property comprises one member selected from a group consisting of: a color, a type of a vehicle, vehicle profile and vehicle make, at least part of a registration identifier of the at least one vehicle, a visually identified damage to the at least one vehicle, a sticker attached to the at least one vehicle. According to some embodiments if the level of confidence does not exceed a threshold then notifying a requestor for fueling the vehicle. According to some embodiments the method comprising authenticating a location of the vehicle for performing a fueling transaction. According to some embodiments wherein second signature is from a list of vehicles associated with the requestor for fueling the vehicle. According to some embodiments the method further comprising: receiving an indication of a fueling transaction associated with a certain vehicle and a fueling site; obtaining a capture of a vehicle in the site; accessing a vehicle profile associated with the vehicle; analyzing the capture for identifying at least one discrepancy between the vehicle profile and the vehicle; and updating profile of the vehicle in accordance with the discrepancy. According to some embodiments the method further comprising: receiving an indication of a fueling transaction associated with a vehicle and a site; in response to the received indication, accessing information related to the vehicle; obtaining a capture of the vehicle in the site; generating a data example comprising a depiction of the vehicle based on the capture and the information related to the vehicle; and adding the data example to a dataset.

According to some embodiments the method further comprising obtaining image data depicting the fueling transaction; analyzing the image data to detect a first part of the image data depicting a connection of a fueling nozzle to the vehicle; analyzing the image data to detect a second part of the image data depicting a disconnection of the fueling nozzle from the vehicle; and generating a visual summary of the fueling transaction comprising at least the detected first part of the image data and the detected second part of the image data, while omitting at least the a third part of the image data located between the detected first part and the detected second part. According to some embodiments the threshold is determined in accordance with probability of finding the vehicle in the site. According to some embodiments the threshold is determined by a request or usage pattern or the lack of the pattern.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
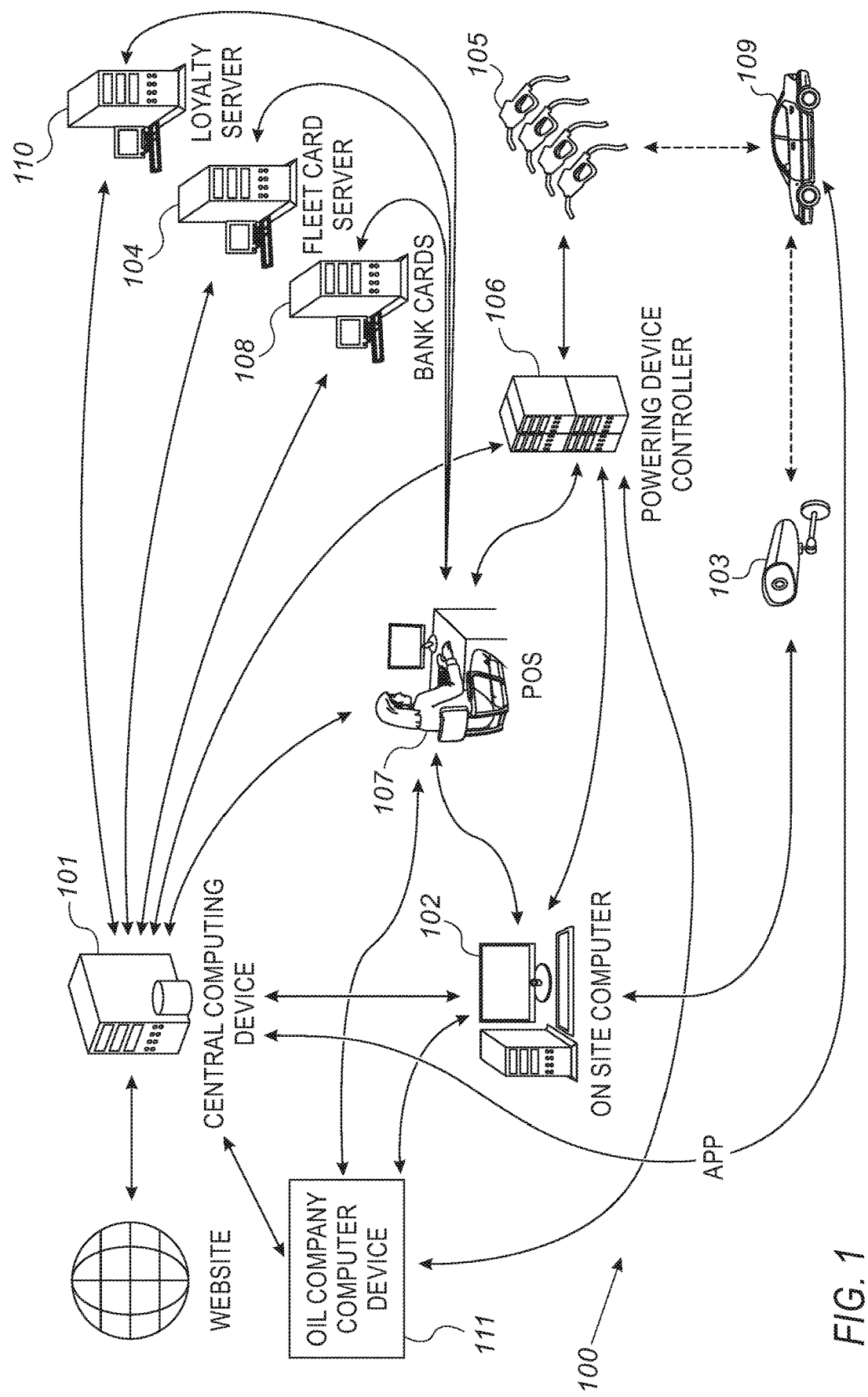
FIG. 1 shows a block diagram of an environment for authenticating the transaction, in accordance with some embodiments of the disclosed subject matter.

FIG. 1 shows a block diagram of an environment for authenticating the transaction, in accordance with some embodiments of the disclosed subject matter.

Environment 100 includes a central computing device 101, an on-site computing device 102, a plurality of capturing devices 103, a vehicle 109, a plurality of powering devices 105, a powering device controller 106, A POS (Point of Sale) computing device 107, a bank card server 108, a fleet card server 104, oil company computing device 111 and a loyalty server 110.

The vehicle 109 enters the site for performing a fueling or charging. The computing device of the authorized entity of the transaction (not shown in the figure) communicates with the on site computing device 102 for performing the transaction. If there is no on site computing device 102 the computing device may communicate directly with the central computing device 101.

The capturing devices 103 are configured to capture a capture of the vehicles 109 that is located in the site. The capturing devices 103 are located in various locations in the site and provide captures of the vehicle 109 in the various locations of the site. The capture may be used for identifying properties of the vehicle and for generating a signature. The capture may also be used for identifying the location of the vehicle at a certain time and for selecting the powering devices and hose or charging cable for performing the powering. The capture may also be used for reporting events associated with the transaction to the authorized entity. The capture may also be used for detecting and reporting frauds associated with the transaction.

The capturing devices 103 communicate with the on site computing device 102 and transfer the captures to the on site computing device 102. The capturing devices 103 may include Surveillance (CCTV) cameras which may be deployed at various locations of the site as a separate and independent channel or as part of the security system of the site.

The onsite computing device 102 receives the captures from the capturing devices and performs a process for identifying properties and the location of the vehicle from captures. The onsite computing device 102 is also configured for identifying nearest powering device to a vehicle for which a request for fueling is issued.

The onsite computing device 102 may communicate with the point of sale (POS) computing device 107 for performing the transaction and for authenticating the fueling or charging transaction. The onsite computing device 102 may communicate with the central computing device 101 for authenticating the vehicle and for authenticating the authorized entity. The operations of the of the onsite computing device 102 are explained in greater details in FIG. 3. The onsite computing device 102 may communicate with the powering device controller 106 for controlling the powering device controller 106. In some other embodiments the central computing device may communicate with the point of sale (POS) computing device 107.

The plurality of powering devices 105 are adapted to power the vehicle. The locking and unlocking of the plurality of powering devices 105 is performed by the powering device controller 106 in accordance with instructions from the Central computing device.

The central computing device 101 is configured for performing and for authenticating the transaction. The central computing device 101 is explained in greater details in FIG. 8.

The central computing device 101 is in communication with the point of sale computing device 107 and with the powering device controller 106 for operating the powering device controller.

The oil company computing device 111 is in communication with central computing device 101, with the on site computing device 102, with the point of sale 107 and with the powering device controller 106. The oil company computing device 111 is configured for transferring data from the on site computing device 102 to the point of sale 107, to the powering device controller 106 to the central computing device 101 and vice versa.

The oil company computing device 111 is also configured for storing data associated with the fueling transaction. Such data include images, reports, commands etc. The oil company computing device 111 is also configured for load-balancing the communication between the sites and the central computing device for improving the performance of the communication. The oil company computing device 111 may also be configured for performing tasks associated with the central computing device 101 and with the on site computing device 102.

It should be noted that the number of devices is exemplary in nature and more or fewer number of devices may be presented.

In some embodiments an on-site computing device 102 performs also the operations of the central computing device 101. In some other embodiments the central computing device 101 performs also the operations of the on-site computing device 102.

In some embodiments the an on-site computing device 102, the sensor 103, the plurality of pumps and nozzles 105, the pump computing device 106, and the POS (Point of Sale) computing device 107 are located in the site.

In some embodiments the bank card server 108, the fleet card server 109, the loyalty server 104 and the central computing device 101 are located outside the site and may communicate with the site via the internet network.

The communication in site may be for example through either wired or wireless communication protocols such as Ethernet, Bluetooth and/or Wi-Fi and/or NFC or through the Internet. Communication between the site and computing devices outside the site may be for example via the internet cloud, Intranet of the Oil Company, dedicated telephone line and others.

Figure 2:
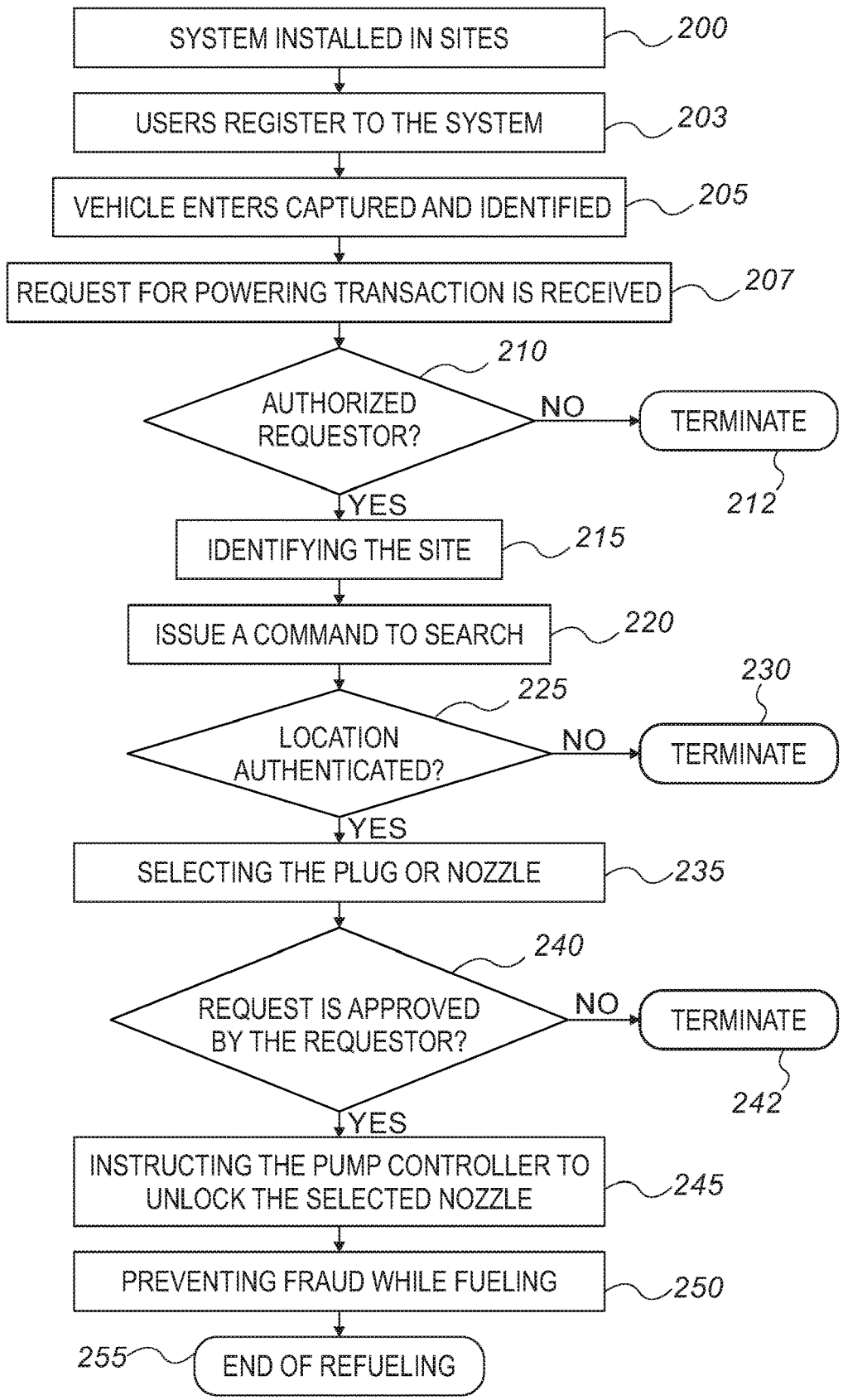
FIG. 2 shows a block diagram of a scenario for authenticating the transaction, in accordance with some embodiments of the disclosed subject matter.

FIG. 2 shows a block diagram of a scenario for authenticating the refueling or charging transaction, in accordance with some embodiments of the disclosed subject matter.

At block 200 the system is installed in the sites. The installation process may include configuring data-sets related to the capturing devices and to the powering devices in each of the sites. The installation process includes performing simulation and learning of the site. According to some embodiments the system is trained in order to be able to identify models of vehicles, location of powering devices on site, topology of the site etc.

At block 203 users register to the system. A user may be a private user or an administrator of a fleet of vehicles or a driver in such a fleet. The registration may be via the WEB or via an application in a mobile device.

The registration process may include configuring the generic properties of each vehicle for which a user is authorized to power, configuring details that identify the authorized entity (name, mobile number of a cellular device associated with the user, contact information of each user, etc) and details for performing the payment (e.g. credit card number, bank account number, amount that is authorized for payment).

The registration may include associating a user with a vehicle. The registration may also include associating multiple users with multiple vehicles. The registration may also include associating a user with multiple vehicles. The registration may also include associating multiple users with a vehicle.

The registration may be performed by a private user or by a user that is an employee of a company which owns a fleet of vehicles.

At block 205 a vehicle enters the site.

As a result the capturing devices capture the captures of the vehicle in the various locations of the site. The captured are processed for identifying and for authenticating the vehicle. The process of identifying and authenticating the vehicle is explained in greater details in FIG. 3.

The captures may be transferred to other computing devices which may be located on site or remote of the site. The captures may also be transferred to a control room or to certain persons for any action required as a result of the identification.

It should be noted that the process of capturing a vehicle and of identifying and authenticating the vehicle is performed continuously and periodically.

The system may also identify the authorized entity associated with the vehicle and may send a message to the authorized entities of the vehicle for notifying on the arrival of the vehicle to the site. The notification message may suggest an authorized entity that is outside of the site to issue a request for powering transaction.

At block 207 the system receives a request from a requestor for powering transaction. The request includes the identity of the requestor.

In one embodiment the request is received from a driver of a vehicle upon parking near a powering device inside the powering area. In such a case the request to start the powering process may be sent from a mobile device of the driver of the vehicle. In such a case the request may also includes the location of the mobile device.

In one other embodiment the request may be received from an authorized entity that is located outside of the site and authorizes the driver to fuel. For example, when the vehicle is an autonomic vehicle or when the vehicle is not driven by an authorized entity.

The request may also be received from a computing device that is embedded in the vehicle.

The request may be initiated manually or automatically. An example of automatic initiating is when detecting the mobile device of the driver in the proximity of the site. Such detecting may be performed by methods such as geo-fencing.

The request may include the location of the site for fueling, the identification of the requestor, the identification of the vehicle and the time of the request.

At block 210 the system checks that the requestor is an authorized entity.

The system may check that the driver is authorized to fuel in this site or that his fuel consumption is within the quota. In some embodiments the system authenticates the location of the requestor and verifies that the requestor is within the site.

If the requestor is not authorized then at block 212 the operation terminates and the system sends alert messages; such alert messages may be sent to the fleet manager.

Otherwise operation proceeds to block 215.

At block 215 the central computing device identifies the site from which the event is received according to the location. In one example the identification is according to the location of the mobile device of the requestor.

At block 220 the central computing device issues a command for the on site computing device to search for the vehicles that are associated with the requestor and that are currently on site.

At block 225 the system identifies and authenticates the location of the vehicle. The authentication of the location of the vehicle is explained in greater details in FIG. 4.

If the location of vehicle is authenticated for performing the transaction, then operation continues to block 235.

Otherwise at block 230 the system sends a message to the computing device of the requestor indicating that the powering is not authenticated. The system may also send such a message to the pump controller. The operation may be terminated. In some embodiment a message is sent to a resolution center.

At block 235 the central computing device or the on site computing device selects one or more hose or charging cables for the powering. The one or more hose or charging cables may be selected according to the make of the vehicle, its fuel or charging type or charging method.

At block 240 the system may send a message to the requestor for approving powering process. The message may include the vehicle identification, the identification of the powering device, the selected hose or charging cable, the fuel type the name of the requestor, the location of the site and etc.

The approving may be for example by clicking or by gesturing or by voice command etc.

If the requestor does not approve the request then at block 242 the operation terminates.

At block 245, which occurs if the requestor approves the request, the system instructs the pump controller to unlock the selected nozzle or connector and to start the powering process. A message indicating the charging or fueling may be sent to the Point Of Sale and/or to the central computing device. The Point of Sale (POS) may communicate with the loyalty server for promoting sales. The Point of Sale (POS) may communicate with the fleet car server for and/or with the bank card for performing the transaction.

Instructing the pump may be performed by the central computing device or by the on site computing device or by the oil company computing device.

At block 250 the system starts the process of preventing fraud while fueling or charging. The process of preventing fraud while fueling is explained in greater details in FIG. 5.

At block 255 the pump controller identifies the end of the refueling or charging process and sends a notification message to the system. The system sends a notification message to the computing device of the requestor. The notification message may include details about the transactions.

Figure 3:
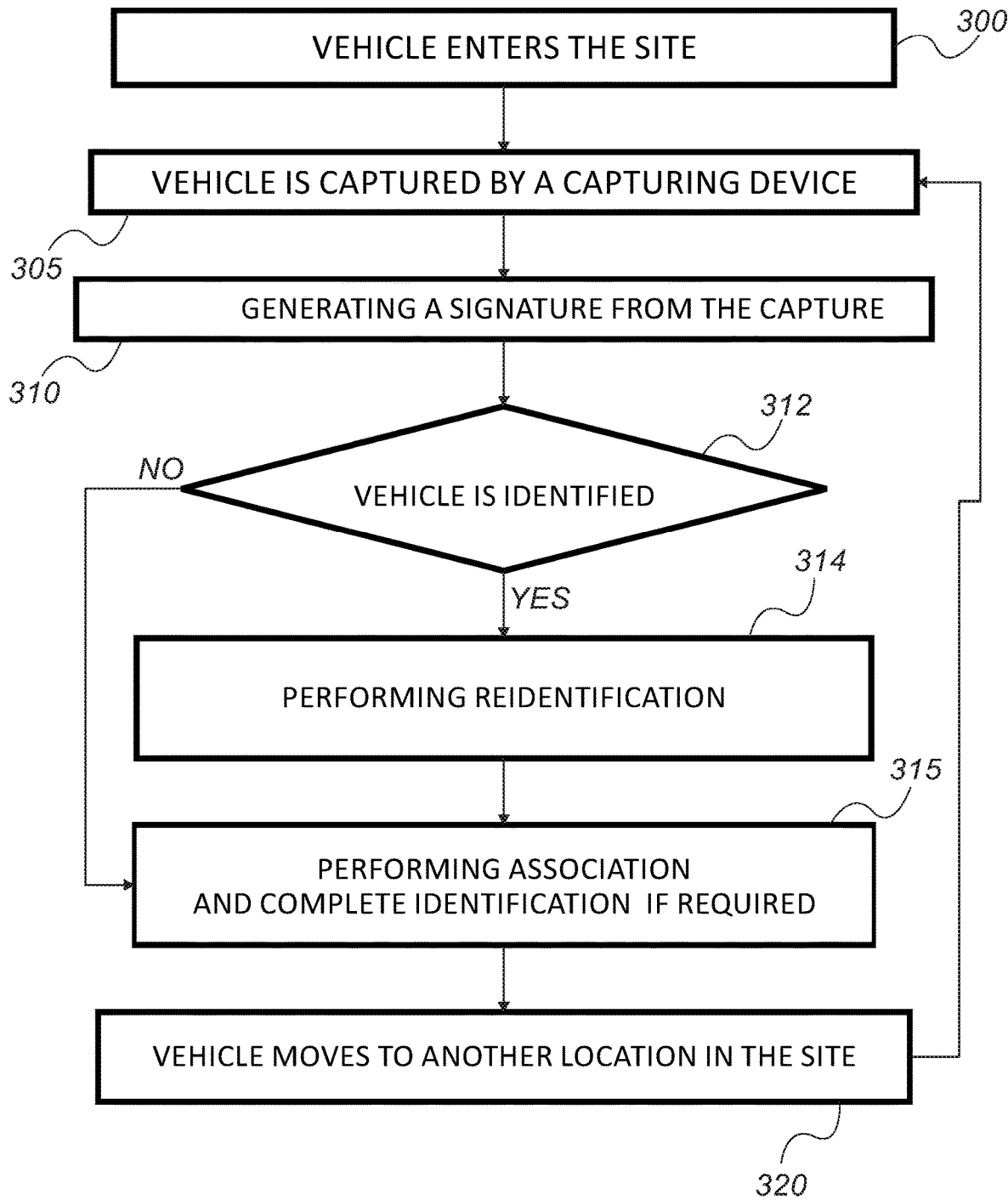
FIG. 3 shows a flowchart diagram of a method for identifying and authenticating a vehicle, in accordance with some embodiments of the disclosed subject matter.

FIG. 3 shows a flowchart diagram of a method for identifying and authenticating a vehicle, in accordance with some embodiments of the disclosed subject matter.

According to some embodiments the system overcomes a technical problem of how to identify a vehicle by a capture.

According to one other embodiment the system overcomes the problem of how to identify a vehicle that is hidden by another vehicle or a wall or any other object.

According to one other embodiment the system overcomes the problem of how to detect frauds that are performed as a result of replacing the plate of the vehicle with another plate.

The system correlates the captures from capturing devices installed in the fueling or charging station. According to some embodiments each module that is associated with a capturing device performs an online learning process. The output of each module is periodically sent to a central module that performs its learning process from the correlation between the captured that are received from the capturing devices. The output of the learning process of the central module is then utilized by the learning process of the modules associated with the capturing devices. Thus, each capturing devices improves its learning process by data that is correlated from the other capturing devices.

Such a process enables to utilize the capturing devices that already exist in the site and to compensate for mal output from one or more devices.

Referring to the drawing:

At block 300 a vehicle enters the site.

At block 305 the vehicle is captured by a certain capturing device. The capture is sent to a computing device for processing. It should be noted that the processing may also be performed by the on site computing device or by the local computing device or by the main server or by the capturing device.

At block 310 the capture of the vehicle is processed by a capturing module that handles the captures of the certain capturing device. If the capture is analog the module may perform analog to digital process for processing the capture.

The module may also identify the location of the vehicle. The location is associated with the capturing device. The location of the vehicle and the time associated with the location is stored in a data repository.

The capturing module extracts the unique properties and the generic properties of the vehicle from the capture. The capturing module generates a signature of the vehicle from the extracted features.

At block 312 the signature of the vehicle maybe used for identifying the vehicle and for generating a confidence level for the identification.

If the confidence level is above an identification threshold then the vehicle is identified and operation continues to block 314 for performing re-identification.

The re-identification is for adjusting the confidence level of the identification.

Otherwise operation continues to block 315 for associating with other captures of other capturing devices in the site in an attempt to identify the vehicle by association with an identification performed by another capturing device onsite.

At block 314 the re-identification module performs re-identification. The re identification process compares the unique properties that are extracted from the current capture to unique properties that are extracted from previous captures associated with the identified vehicle. The previous captures may be from a same capturing device or from another capturing device (on site, or on any other site) or from any other database associated with the identified vehicle.

For example, if the vehicle has a certain visible damage, the damage is learned by the module for further processes of identification of the image. Examples of such re-identification models are Siamese networks.

The re-identification generates a refined confidence level.

If the refined confidence level is below a fraud threshold then the system identifies a fraud and may perform mitigation. Such a fraud may be related to replacing a plate of the vehicle or altering an existing plate. In such a case the vehicle signature associated with the detected plate that is stored in the data repository differs from the identified vehicle signature and this leads to low confidence level.

Block 315 describes the process of associating the properties that are learned from a plurality of captures of the vehicle in a plurality of locations in the site. The associating (correlating) includes associating the signature calculated from a capture of a certain capturing device with signatures calculated from other captures from other capturing devices. The association (correlation) overcomes a technical problem of identifying a vehicle in location wherein the vehicle is not completely captured by the capturing device (for example when being hidden behind another vehicle) and therefore allows identification even in cases where identification from a single capture or from a single capturing device is not possible.

At block 315 the capture of the capturing device as well as the results of the capture are transferred to a central module. In some embodiments the results are transferred as blobs. The central module performs the association between pluralities of captures of the vehicle from a plurality of locations. In one example the association of concurrent capture sequences is performed by motif matching.

The association process may also utilize the velocity and the direction of the vehicle as detected by the capturing device to associate with captures from other capturing devices according to the physical relations between the capturing devices. In some embodiments the model for physical relations between the capturing devices is updated upon successful association.

The association process may also improve the signature of the vehicle by adding the signature of the vehicle to signatures of the same vehicle that were generated by the captures of various capturing devices.

The output of the association process may be utilized by the capturing modules associated with the capturing devices.

The results of the association process as well as the updated signatures may be stored in a data repository for future use.

At block 320 the vehicle moves to another location in the site.

As a result, at least one other capturing device captures another image of the vehicle and the module that is associated with this capturing device processes the image Operation resumes to block 305.

The operation of blocks 305, 310, 315 and 320 may repeat until the vehicle leaves the site and there are no more captures of the vehicle.

Figure 4:
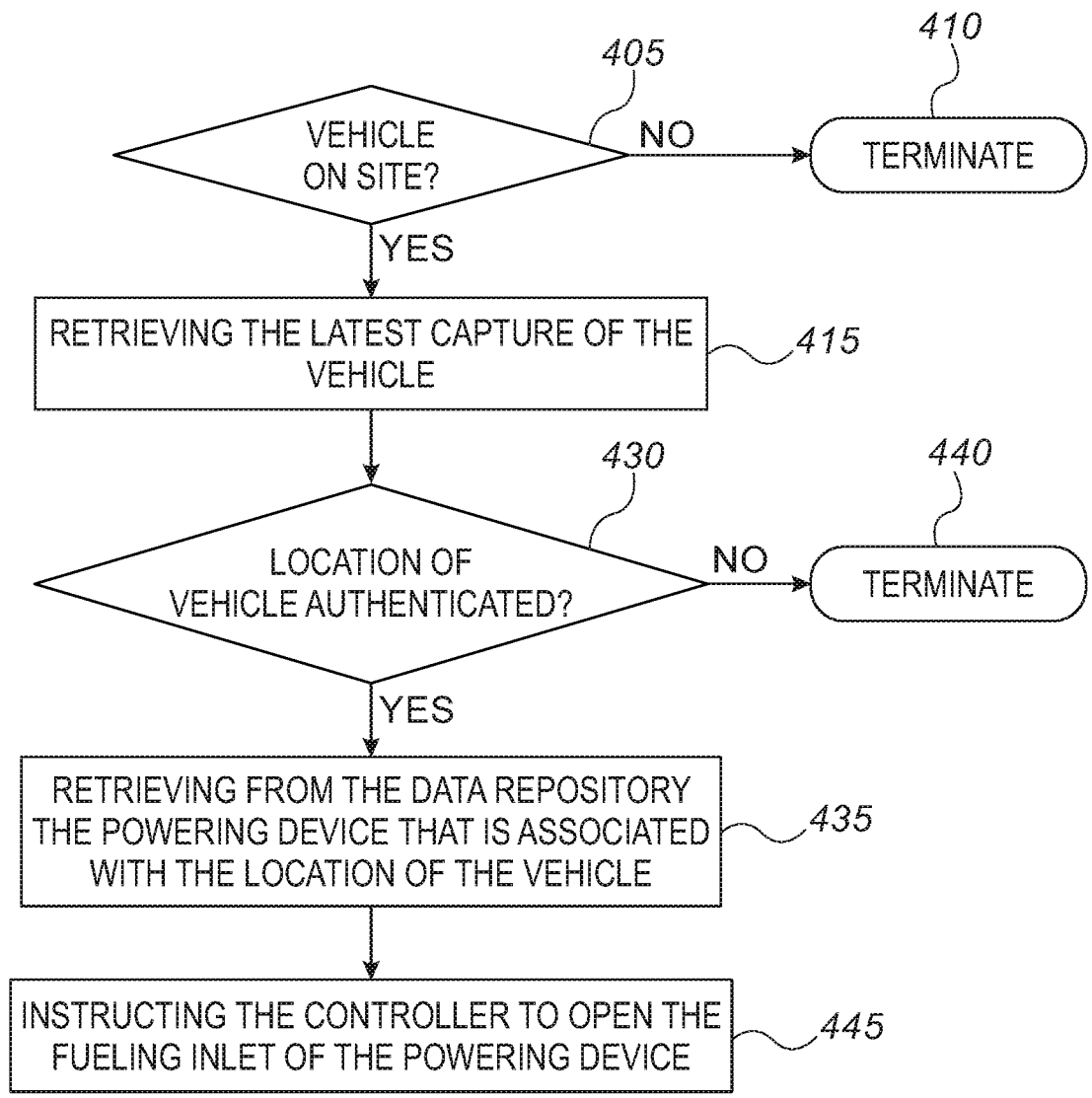
FIG. 4 shows a flowchart diagram of a method for authenticating a vehicle while fueling, in accordance with some embodiments of the disclosed subject matter.

FIG. 4 shows a flowchart diagram of a method for authenticating a vehicle while fueling, in accordance with some embodiments of the disclosed subject matter;

According to some embodiments the authenticating process includes the identifying of the vehicle, the identification of the powering device to be used, the authenticating of the vehicle and the authenticating of the location of the vehicle relative to the powering device.

The authentication process is in response to a request for powering transaction that is received from an authorized entity.

At block 405 the system queries the data repository for an identification of one or more vehicles that the requestor is authorized to power and that are currently on site.

If such a vehicle is not in site, then at block 410 the system sends notification messages and the process terminates.

At block 415 the system retrieves from a data repository the latest capture of the vehicle in the site.

At block 430 the system authenticates the location of the vehicle. The authentication may be performed continuously and for a pre defined period for enabling the arrival of the vehicle to the area for powering.

According to some embodiments the system defines either by a learning process or by a configuration process the X and Y coordinates of all the powering area on site.

The definition may take into account the length of the hose, the location of the powering device, and the position of the powering device and the structure of the site.

The learning process may learn from the previous capturing of the vehicles on site the locations of the vehicles when powering, the structure of the site and the locations and position of the powering devices.

Each capture of a capturing device is associated with coordinates that cover the area that is captured by the capture.

The system checks the coordinates in which the vehicle is located according to the capture of the vehicle and verifies that these coordinates are within the area of fueling.

If the vehicle is within the area of fueling, the location of the vehicle is authenticated and operation proceeds to block 435.

Otherwise, at block 440 the operation is terminated and a notification message is sent. In one other embodiment a message is sent to the requestor instructing the requestor to move the vehicle to the nearest powering area.

At block 435 the system retrieves from the data repository the identification of the powering device that is associated with the location of the vehicle.

At block 445 the system instructs the controller to release the nozzle from the fuel pump or to release the connector from the charging device in order to start the powering process.

Figure 5:
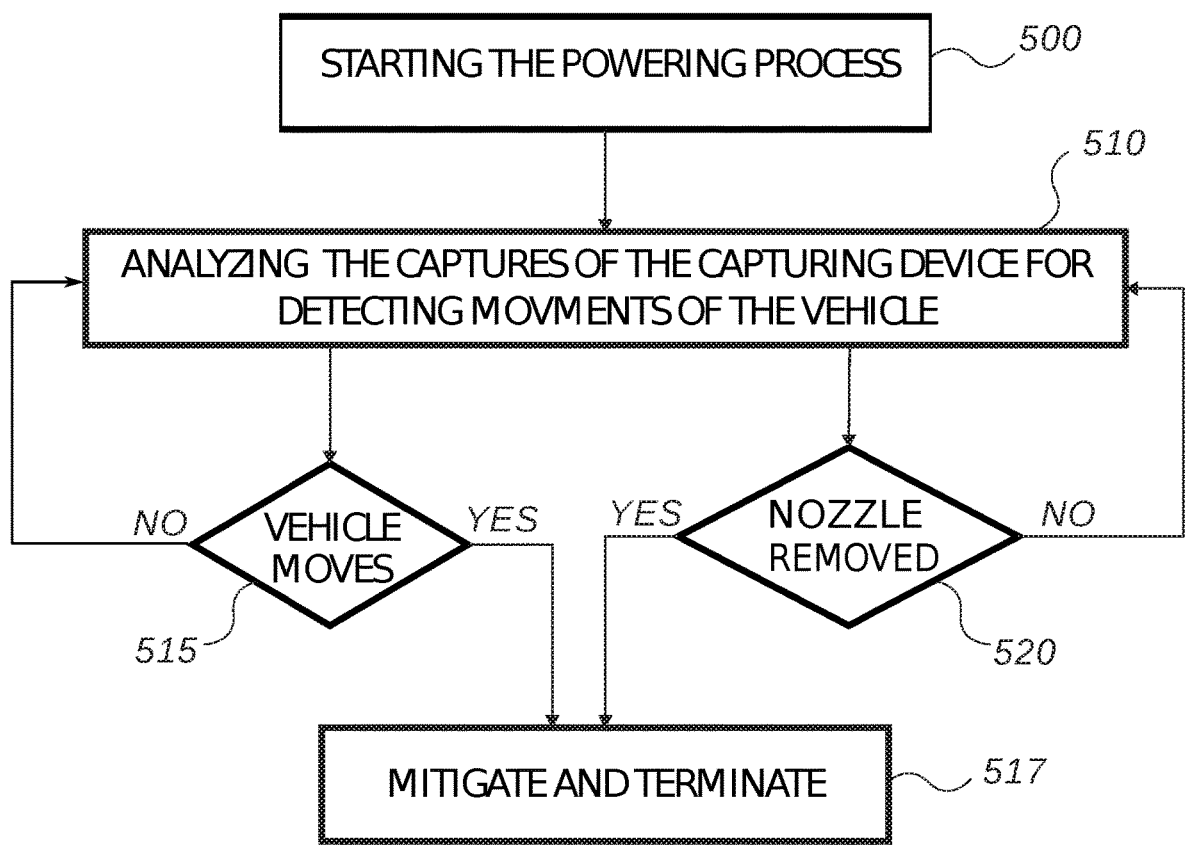
FIG. 5 shows a flowchart diagram of a method for preventing a fraud while refueling or charging, in accordance with some embodiments of the disclosed subject matter.

FIG. 5 shows a flowchart diagram of a method for preventing a fraud while refueling or charging, in accordance with some embodiments of the disclosed subject matter.

According to some embodiments the system identifies a change in the location of the vehicle while fueling for detecting frauds.

According to other embodiments the system detects removing of the nozzle from the fuel inlet or the removing of the connector from the socket inlet during the fueling (charging) process. Upon detecting the removal the system may terminate the fueling (charging), transfer an image of the vehicle to the manager of a fleet of the vehicle or send an alert message. According to some embodiments the longer the time of detecting the removal the higher the probability of detecting fraud.

Such a method allows detection of frauds such as transferring a fueling (charging) device to an unauthorized vehicle, utilizing the transaction for fueling or charging another vehicle or a container by removing the nozzle from the fueling (charging) opening of the vehicle after the transaction is authorized and inserting the nozzle to another vehicle or to a container or by utilizing a fueling card that is dedicated to fuel an authorized vehicle for fueling and unauthorized vehicle, etc.

Referring to the drawing:

At block 500 the process of powering starts.

At block 510, which occurs periodically and as long as the powering process continues, the system analyzes the captures of the capturing device that is associated with the powering device that perform the powering.

Blocks 515 and 520 are performed independently from each other and simultaneously.

Block 515 occurs periodically and as long as the powering process continues.

At block 515 the system checks if there is a movement of the vehicle. The detection of the movement is performed by methods known in the art such as object detection and tracking.

If there is a movement operation proceeds to block 517 for mitigating fraud.

Otherwise operation resumes block 510.

At block 517 the system mitigates the fraud and may terminate the process. Mitigating may be implemented by sending a control message to stop fueling and sending alert messages. The alert messages may include an image of the vehicle while moving. The alert messages may be sent to the one or more entities that are authenticated for fueling, to a manager of a fleet of vehicles, to a computing device of the site etc. The probability of the fraud may increase due to the following events: the user as already performed a fraud, the vehicle is located away from the center of the powering area, there are other vehicles in the powering area the nozzle is moved to another vehicle etc. The probability of the fraud may affect the decision of sending an alert. The alert message may include the probability of the fraud. The probability of the fraud may affect the decision of terminating the fueling proves.

At block 520 which occurs periodically and as long as the powering process continues, the system checks if the nozzle is removed from the fueling inlet or if the connector is removed from the socket inlet.

According to some embodiments the system is trained to detect the fueling inlet and the nozzle (or the socket inlet and connector in the case of charging) at initialization and during the operation of the site. The training may be performed by methods such as active learning. Such training enables to detecting the removal of the nozzle or the connector.

If a removal event is detected then operation proceeds to block 517 for mitigating and terminating otherwise operation resumes to block 510 for continuing the inspection.

Figure 6:
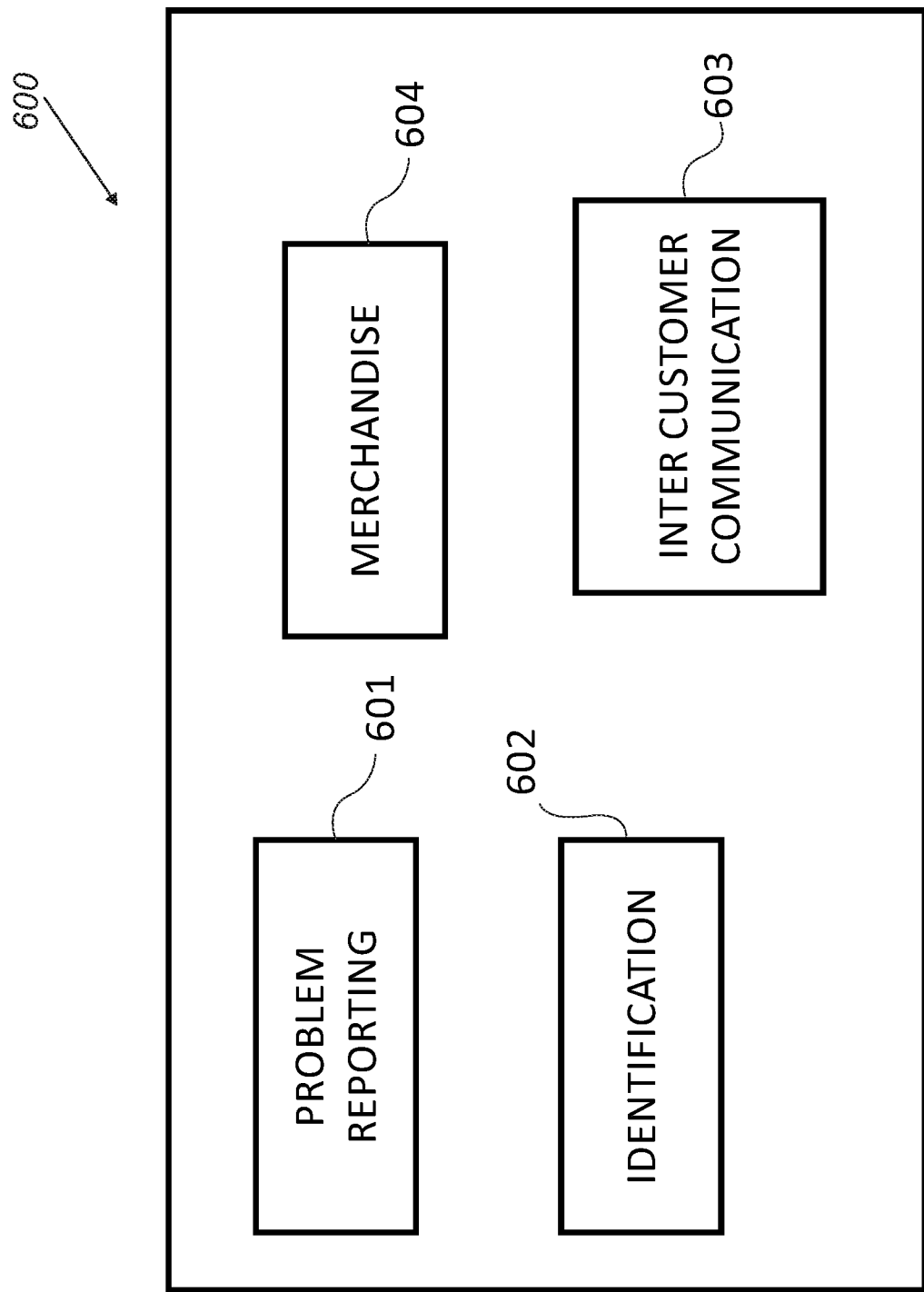
FIG. 6 shows a block diagram of the application module, in accordance with some embodiments of the disclosed subject matter.

FIG. 6 shows a block diagram of the application module, in accordance with some embodiments of the disclosed subject matter.

Application module 600 includes a problem reporting module 601, user identification module 602, inter customer communication module 603, and merchandise module 604.

The problem reporting module 601 is configured for reporting problems associated with transactions to the on site computing device (not shown in the figure) and/or to the central computing device (not shown in the figure).

The user identification module 602 is configured for communicating with the central computing device for authenticating the user.

The inter customer communication module 603 is configured for providing a platform for communicating with other users in the system.

The merchandise module 604 is configured for communicating with the POS (POINT OF SALE) computing device for purchasing merchandises via the application.

It should be noted the user may enter the system via an application installed in his mobile device or via the web interface.

Figure 7:
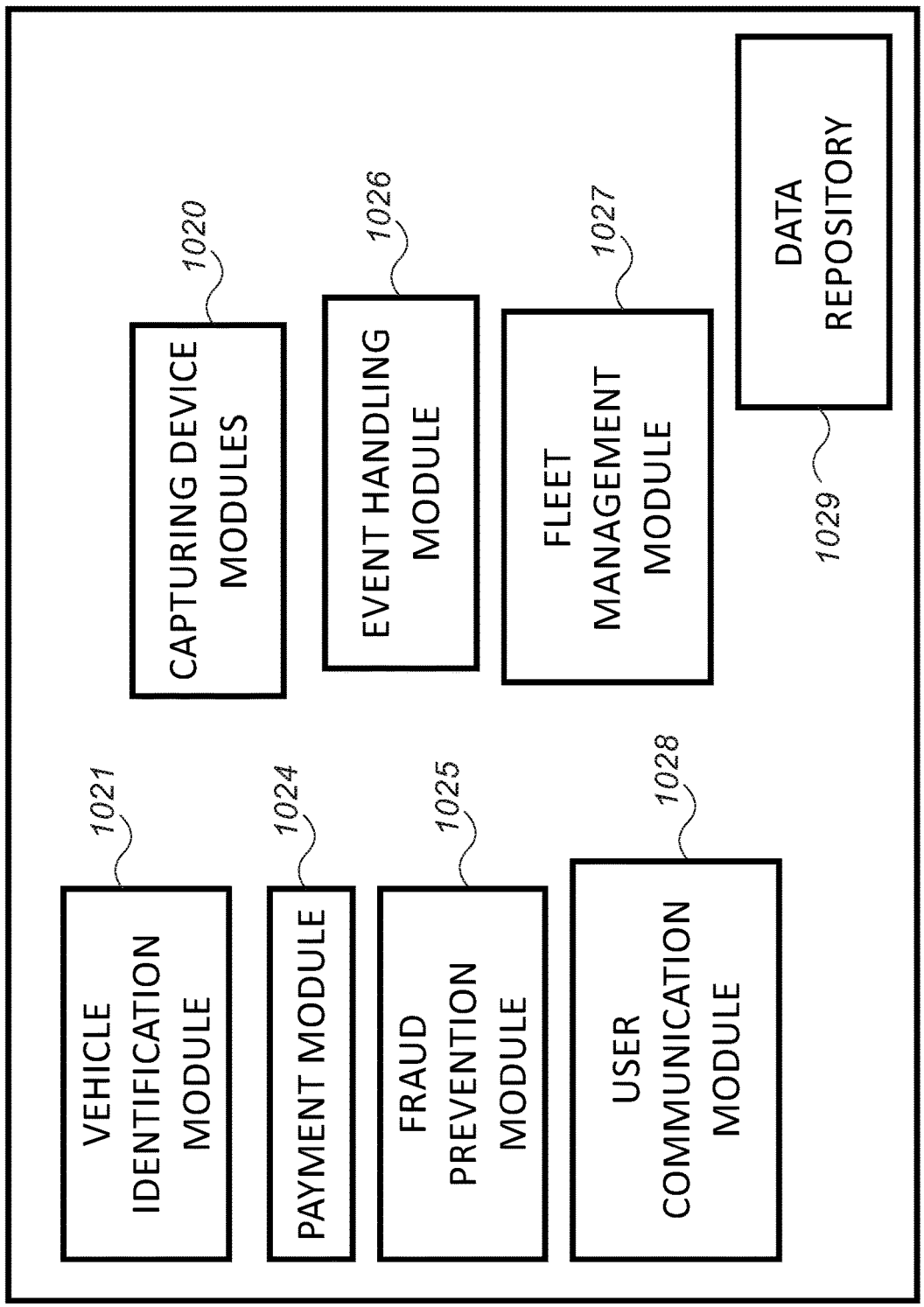
FIG. 7 shows a block diagram of the on-site computing device, in accordance with some embodiments of the disclosed subject matter.

FIG. 7 shows a block diagram of the on site computing device, in accordance with some embodiments of the disclosed subject matter.

The on site computing device 102 includes a vehicle identification module 1021, a capturing device modules 1020, payment module 1024, and a fraud prevention module 1025, an event handling module 1026, a fleet management module 1027, a user communication module 1028 and a data repository 1029.

Each of the capturing device modules 1020 is associated with a capturing device and is configured for identifying vehicles and locations of the vehicles from the captured image of the associated capturing device.

The vehicle identification module 1021 is configured for associating the output of the learning process of the plurality of capturing device modules 1020. The process of the capturing device modules 1020 and the vehicle identification module 1021 is explained in greater details in FIG. 3.

The payment module 1024 is configured for communicating with the bank card server (not shown in the figure), the fleet card server (not shown in the figure) and a loyalty server (not shown in the figure) for performing the transaction.

The fraud prevention module 1025 is configured for preventing frauds. The method for preventing frauds is explained in greater details in FIG. 5.

The event handling module 1026 is configured for managing events in the site. Such events may include for example identifying a fraud etc. Such frauds may be for example an attempt to fuel non authorized vehicle, a removing of the nozzle from a fuel inlet for filling a container etc.

The fleet management module 1027 is configured for communicating with the fleets of vehicles for alerting on fraud events etc.

The user communication module 1028 is configured for communicating with private users for alerting on fraud events etc.

In some cases, the on site computing device 102 is not installed on site and the functionality of the on site computing device is performed by the central computing device.

The data repository 1029 is configured for storing data such as events in site, detected plate numbers, location of identified vehicles properties of powering device of the site, data sets for the learning process etc.

It should be noted that some or all of the modules of the on-site computing device may be implemented and performed from the central computing device.

Figure 8:
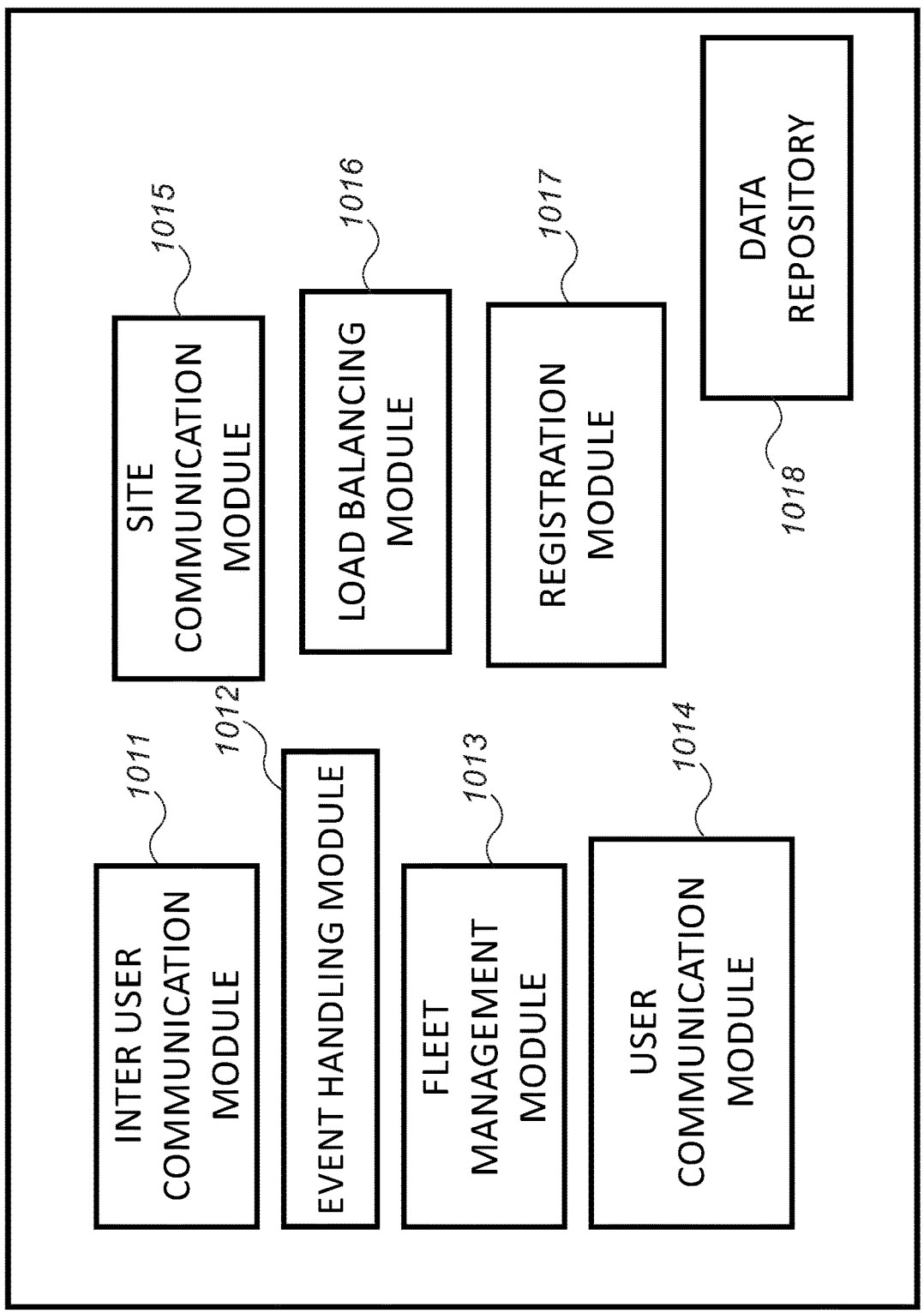
FIG. 8 shows a block diagram of the central computing device that is installed in the mobile device, in accordance with some embodiments of the disclosed subject matter.

FIG. 8 shows a block diagram of central computing device that is installed in the cloud.

The central computing device 101 includes an inter user communication module 1011, an event handling module 1012, a fleet management module 1013, user communication module 1014, a site communication module 1015, a load balancing module 1016, registration module 1017 and data repository 1018.

The inter user communication module 1011 is configured for providing communication between users.

The event handling module 1012 is configured for handling events that are received from a plurality of sites. The event handling module 1012 may also be configured for receiving fueling or charging requests and for instructing the on-site computing device to start fueling.

The fleet management module 1013 is configured for communicating with the computing devices of the fleets of vehicles for registration, payment, reports etc.

The user communication module 1014 is configured for communicating with the private users for registration, payment, reports etc.

The site communication module 1015 is configured for communicating with the sites for authenticating the vehicles and the users and for performing the transaction.

The Load balancing module 1016 is configures dividing the work load among other servers (not shown in the figure). In some examples, load balancing module 1016 may be implemented as a software program, a hardware solution or a combined software and hardware solution. In some implementations, load balancing modules 1016 may interact with registration module 1017 in order to obtain information regarding the availability of the other servers (not shown in the figure). In some examples, other servers (not shown in the figure) may notify load balancing modules 1016 of their status, for example by sending messages: at startup; at computational shutdown; at constant intervals; at selected times; in response to queries received from load balancing modules 1016; and so forth. In some examples, load balancing modules 1016 may query about the other server status, for example by sending messages: at load balancing module startup; at constant intervals; at selected times; and so forth.

The registration modules 1017 is configured to track the availability of the other servers.

The data repository 1016 is configured to store information of the sites, properties of vehicles etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

While various inventive embodiments have been described and illustrated herein, those of ordinary skill in the art will readily envision a variety of other means, materials, or structure for performing the function, obtaining the results, or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be for example only and that the actual parameters, dimensions, materials, and configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims, equivalents thereto, and any claims supported by the present disclosure, inventive embodiments may be practiced otherwise than as specifically described and claimed. Inventive embodiments of the present disclosure are directed to each individual feature, system, article, material, composition, kit, method, and step, described herein. In addition, any combination of two or more such features, systems, articles, materials, compositions, kits, methods, and steps, if such features, systems, articles, materials, compositions, kits, methods, and steps, are not mutually inconsistent, is included within the inventive scope of the present disclosure. Embodiments disclosed herein may also be combined with one or more features, functionality, or materials, as well as complete systems, devices or methods, to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, as noted, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, the method comprises:
   receiving, from a capturing device, a first capture of a first vehicle;
   calculating a first value from any one of: a generic property of said first vehicle extracted from said first capture and a unique property of said first vehicle extracted from said first capture, a plurality of unique properties of said vehicle extracted from said first capture and a plurality of generic properties of said vehicle extracted from said first capture, said first value being a signature of said first vehicle;
   comparing said first value to a second value, wherein said second value being a second signature calculated from a combination of: said unique property of a second vehicle extracted from a second capture and said generic property of said second vehicle extracted from said second capture, a plurality of said unique properties of said second vehicle extracted from said second capture and a plurality of said generic properties of said second vehicle extracted from said second capture, said comparing resulting in a level of confidence;
   if said level of confidence exceeding a threshold then identifying said first vehicle as being the second vehicle;
   authenticating by said identifying said first vehicle a fueling request for said first vehicle and instructing a computing device to start powering said first vehicle, said computing device controlling a powering device associated with said capturing device;
   during said powering, analyzing captures of said capturing device; and
   by said analyzing, identifying a change in the location of said first vehicle and instructing said computing device to terminate said fueling process in response to said change.

2. The method of claim 1, wherein if said level of confidence exceeds said threshold then performing re-identification for generating an improved confidence level.

3. The method of claim 2, wherein said re-identification comprising comparing said unique property extracted from said first capture with said unique property extracted from a previous capture associated with said vehicle.

4. The method of claim 1, further comprising:
   receiving an indication of a fueling transaction associated with a vehicle and a site;
   in response to the received indication, accessing information related to the said vehicle;
   obtaining a capture of said vehicle in said site;
   generating a data example comprising a depiction of said vehicle based on said capture and the information related to said vehicle; and
   adding said data example to a dataset.

5. The method of claim 2 wherein said threshold is determined by a requestor usage pattern or the lack of said pattern.

6. The method of claim 1, further comprising associating captures from pluralities of captures in a plurality of time frames, wherein said associating taking into account a velocity of and direction of said first vehicle extracted from said plurality of captures and recalculating said first value by said associating for improving said signature of said first vehicle.

7. The method of claim 1, wherein if said first vehicle being identified then notifying a requestor for fueling said vehicle.

8. The method of claim 1, wherein said second vehicle being from a list of vehicles associated with a requestor for fueling said first vehicle.

9. The method of claim 1, further comprising:
   receiving an indication of a fueling transaction associated with a certain vehicle and a fueling site;
   obtaining a capture of said certain vehicle in said site;
   accessing a vehicle profile associated with said certain vehicle;
   analyzing said capture for identifying at least one discrepancy between said vehicle profile and said certain vehicle; and
   updating a profile of said certain vehicle in accordance with said discrepancy.

10. The method of claim 4 wherein said threshold is determined in accordance with a probability of finding said vehicle in said site.

11. The method of claim 1, wherein said unique property being an implicit property.

12. The method of claim 1, wherein said unique property being changeable over time.

13. The method of claim 1, wherein said calculating said value comprises associating a first weight to said generic property of said first vehicle and a second weight to said unique property of said first vehicle and combining said generic property and said unique property in accordance with said first weight and said second weight.

14. The method of claim 13, wherein said unique property being changeable over a time period and further comprising amending said second weight in accordance with a time of capturing said first capture to thereby provide higher weight to a more recent unique property.

15. The method of claim 1 wherein said generic property comprises at least one member selected from a group consisting of: a color, a type of a vehicle, vehicle profile, vehicle make and wherein said unique property comprises at least part of a registration identifier, a visual identified damage to said first vehicle, a sticker attached to said first vehicle and a change in a tire of said first vehicle.

16. The method of claim 1 further comprising receiving a second capture of said vehicle, said second capture being captured at a different location than the location of capturing said first capture, calculating a first value from any of: a generic property of said first vehicle extracted from said second capture and a unique property of said first vehicle extracted from said second capture, a plurality of unique properties of said vehicle extracted from said second capture and a plurality of generic properties of said vehicle extracted from said second capture.

17. The method of claim 1 further comprising receiving a second capture of said vehicle, said second capture being captured at a different time frame than the location of capturing said first capture, calculating a first value from any of: a generic property of said first vehicle extracted from said second capture and a unique property of said first vehicle extracted from said second capture, a plurality of unique properties of said vehicle extracted from said second capture and a plurality of generic properties of said vehicle extracted said second capture.

18. A method, the method comprises:
- receiving a first capture from a first capturing device located in a first location of a site, said first capture being captured in a first time frame;
- identifying a vehicle from said first capture;
- receiving a velocity and direction of said vehicle;
- associating with said first capturing device and with said first time frame a second capturing device and a successive time frame, said associating being in accordance with said velocity and with said direction and in accordance with physical relations between capturing devices in said site;
- selecting a second capture from said second capturing device, said second capture being captured at said successive time frame;
- comparing said first capture with said second capture; and
- if a confidence level resulting from said comparing exceeds a threshold, then identifying said vehicle from said second capture.

19. The method of claim 18 wherein said first capture being captured at a first time and wherein said second capture being captured at a second time.

\* \* \* \* \*